United States Patent [19]

Fecteau et al.

[11] Patent Number: 5,382,083

[45] Date of Patent: Jan. 17, 1995

[54] LIGHT WEIGHT VEHICLE SEAT FRAME

[75] Inventors: Anthony J. Fecteau, Madison Hts.; Christopher Boehme, Temperance; Robert Geenens, Monroe; Lynn Papalambros, Ann Arbor, all of Mich.

[73] Assignee: Hoover Universal, Inc., Plymouth, Mich.

[21] Appl. No.: 69,118

[22] Filed: May 28, 1993

[51] Int. Cl.6 .......................... B60N 2/42; A47C 31/02
[52] U.S. Cl. .............................. 297/452.2; 297/216.2; 297/452.1; 297/452.18
[58] Field of Search ................. 297/216.1, 216.2, 218, 297/232, 452.18, 452.2, 452.56; 403/299, 388

[56] References Cited

U.S. PATENT DOCUMENTS

| 4,440,441 | 4/1984 | Marrujo et al. | 297/216.2 |
|---|---|---|---|
| 4,492,408 | 1/1985 | Lohr | 297/452.56 X |
| 4,603,907 | 8/1986 | Witzke | 297/452.56 |
| 4,761,036 | 8/1988 | Vogel | 297/452.18 |
| 4,784,510 | 11/1988 | Messori | 403/388 X |
| 4,867,507 | 9/1989 | Arai | 297/218 |
| 4,971,379 | 11/1990 | Rumpel et al. | 297/336 X |
| 5,069,505 | 12/1991 | Author et al. | 297/216.2 |

FOREIGN PATENT DOCUMENTS

| 778487 | 12/1934 | France | 403/388 |
|---|---|---|---|
| 415541 | 8/1934 | United Kingdom | 403/388 |

Primary Examiner—Peter R. Brown
Attorney, Agent, or Firm—Harness, Dickey & Pierce

[57] ABSTRACT

The present assembly provides a seat assembly for motor vehicle having a light weight frame made of magnesium for easy removal and reinstallation of the seat assembly in the motor vehicle. The rear cross member of the seat cushion frame is an elongated body having a pair of cavities for high strength while at the same time providing means for attaching structural components to the seat cushion frame. The seat cushion frame components are formed with interiorly extending flanges for mounting the seat trim thereto. The mounting flanges include a notched portion forming a ledge against which a tail portion of a J-clip is seated to facilitate installation of the trim on the seat assembly.

15 Claims, 3 Drawing Sheets

LIGHT WEIGHT VEHICLE SEAT FRAME

BACKGROUND AND SUMMARY OF THE INVENTION

The present invention relates to vehicle seating and in particular to a light weight seat frame for a vehicle seat assembly.

Several models of motor vehicles, such as vans and other multi-purpose vehicles, are equipped with rear seat assemblies that are removably mounted to the vehicle. The removable mounting enables a vehicle owner to remove the seat assembly from the vehicle to increase the vehicle's cargo capacity when needed. The seat assembly can be reinstalled when needed for transporting passengers. With bench type vehicle seats in particular, the large size of the seat assembly results in a heavy seat. This makes removal and reinstallation of the seat assembly a difficult task for all but the strongest of persons. The seat assembly frame is largely responsible for the seat assembly weight.

Accordingly, it is desirable to provide a removable seat assembly having a light weight frame to ease the burden when removing and reinstalling the seat assembly.

The vehicle seat assembly of the present invention includes a frame that is primarily made of magnesium components instead of heavier steel components. Many of the frame components are made of magnesium extrusions having a variety of cross sectional shapes. To maximize the strength for a given weight of material used, many of the extruded parts have hollow cross sections.

While a hollow cross section provides a high strength to weight ratio, the relatively thin walls of the cross section do not offer sufficient material thickness for the attachment of threaded fasteners into the frame components. This is not a problem where a nut can be threaded onto a bolt to attach a component to the frame. However, with a component having a hollow cross section and a substantial length, there is no access to both sides of the frame wall needed for installation of a nut and bolt assembly. This is particularly true of the rear cross member of the seat cushion frame, to which several components are attached. Additionally, even when a nut and bolt assembly is used, the wall thickness of the hollow body may not provide sufficient strength. It is often necessary to spread the load of the nut and bolt assembly over a larger area to achieve the needed strength.

The seat frame of the present invention includes a rear cross member that is an elongated hollow body having two cavities sharing a common wall. To produce strong attachments of components to the rear cross member, tapping blocks are inserted into one of the cavities to the desired locations for the attachments. The tapping blocks consist of a larger solid body of magnesium having a bore therein for reception of a threaded fastener. The blocks provide sufficient material to form a threaded attachment. In addition, the tapping blocks have a large base plate that spreads the fastener load over a larger area.

The seat assembly rear cross member, by having a pair of cavities, enables two tapping blocks to be located at the same longitudinal position in the cross member, one in each of the cavities. This allows more components to be attached to the cross member at a single longitudinal location then if the cross member has only one cavity.

The seat cushion frame rear cross member also includes a forwardly extending flange at its lower edge. The flange has a notch forming a forwardly facing ledge that is used to facilitate mounting of the seat trim to the seat cushion frame. An elongated J-clip sewn to the edge of the trim has a tail end that is seated into the forward facing ledge. The ledge forms a pivot point for rotating the J-clip to align the J-clip opening with the extending flange. Tension in the seat cover then draws the J-clip onto the flange.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
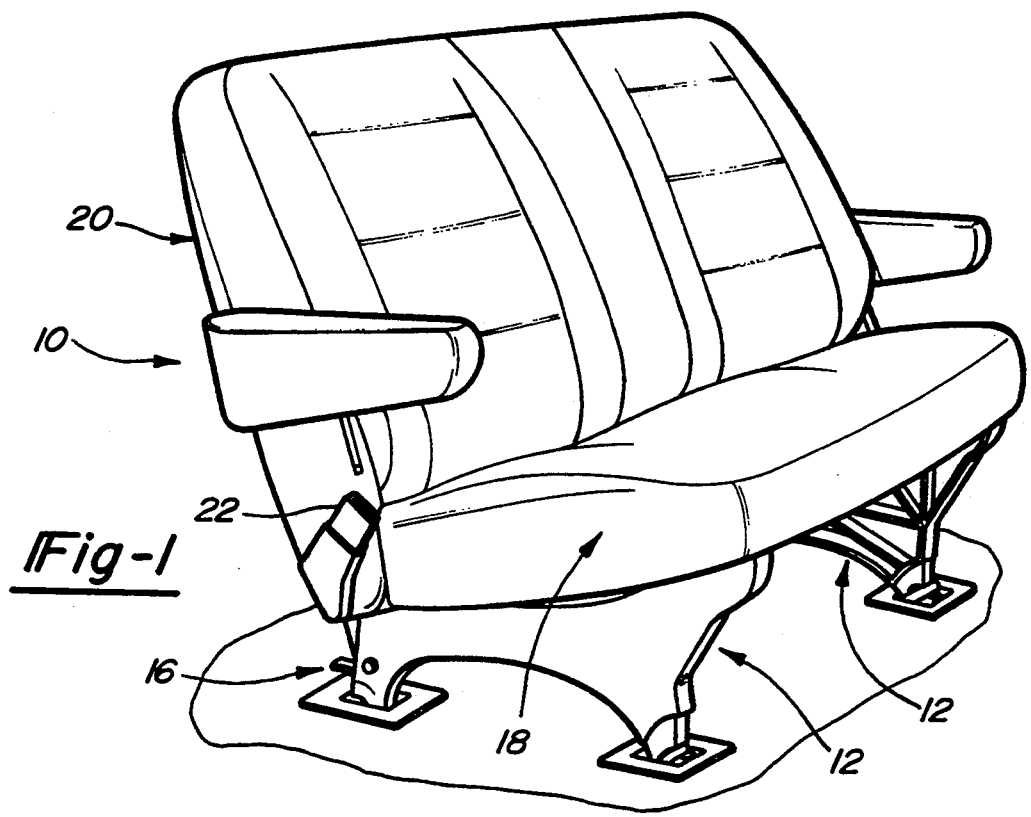
FIG. 1 is a perspective view of a bench seat assembly of the present invention.

The seat assembly of the present invention is shown in FIG. 1 and designated generally at 10. Seat assembly 10 is of a bench seat style for use in a van or other multi-purpose passenger vehicle. The seat assembly 10 includes a pair of laterally spaced risers 12, one at each side of the seat assembly, including front and rear legs. The front legs have a forwardly opened slot 14 at their lower ends while the rear legs have a releasable latch 16 at their lower ends. The slots 14 and latches 16 cooperate with mounting structures in the floor of a motor vehicle floor for removably mounting the seat assembly.

A seat cushion 18 is attached to the upper ends of the risers 12. A seat back 20 is secured to the seat cushion at the rear of the cushion and extends upwardly therefrom. For passenger safety, the seat assembly 10 is equipped with seat belts 22. Because the seat assembly 10 is removable from the vehicle, the seat belts are attached directly to the seat assembly and are removable from the vehicle with the seat assembly. This avoids having the seat belts remain in the vehicle, and in the way, after the seat assembly has been removed. With the seat belts mounted to the seat assembly, it is necessary that the seat frame have sufficient strength to not only support passenger seating loads but to also withstand the loads applied by the seat belts and to transfer these loads to the floor of the motor vehicle through the seat mounting structures.

To facilitate removal and reinstallation of the seat assembly 10, the seat assembly is provided with a light weight frame made of magnesium. The frame includes a seat cushion frame 26 and a seat back frame 36. The seat cushion frame 26 is constructed of rear and front cross members 28 and 30 extending laterally across the seat cushion and a plurality of support members 32 extending fore and aft between the front and rear cross members. The cross members and the support members are joined together by welding, bolting, riveting or the like. The two support members 32, on the ends of the seat cushion frame, are generally U-shaped in cross section with the open end of the U-shaped cross sections facing inwardly of the seat cushion frame. The ends of the front and rear cross members are inserted into the open U-shaped section of the end support members. In the embodiment shown, the cross members are welded to the support members.

The seat back frame 36 is similarly constructed with lower and upper cross members (not shown) and generally upwardly extending support members 42 joined to and extending between the upper and lower cross members. The outboard support members 42 are U-shaped in cross section with the open end facing inwardly and with the ends of the lower and upper cross members 20 being inserted therein.

The seat back frame is mounted to the seat cushion frame by recliner mechanisms generally shown at 44 at each lateral side of the seat assembly. The recliner mechanisms include a fixed plate 46 bolted to the end support member 32 of the seat cushion frame. A rotating plate 50 is bolted to the end support member 42 of the seat back frame. The rotating plate 50 is pivotally mounted to the fixed plate 46 for rotation about the pivot 54. The recliner mechanisms, at the two sides of the seat assembly, enable the angle of inclination of the seat back to be adjusted relative to the seat cushion by rotation of the seat back about the pivot 54. The recliner mechanisms 44 selectively lock the rotating plates 50 in position relative to the fixed plates 46 in a conventional manner.

The seat cushion rear cross member 28 is an elongated hollow body having a pair of cavities 58 and 60 sharing a common wall 56. The hollow nature of the cross member enables its strength to be optimized for a given weight of material. The reason for the two cavities in the rear cross member will be described in greater detail below. While various shapes can be used, in the preferred embodiment shown, the hollow cavities 58 and 60 are quadrilateral in shape and, more specifically, they are trapezoidal. The rear wall 62 is inclined at an angle other than ninety degrees relative to the shared common wall 56 and the lower and upper walls 64 and 66 respectively.

While the hollow body nature of the rear cross member is beneficial from a strength viewpoint, the relatively thin walls of the hollow body make the attachment of various seat components to the rear cross member more difficult. The thin walls do not provide sufficient material thickness for threading of fasteners directly into the cross member. The length of the cross member prevents the use of a conventional bolt and nut assemblies because of the inaccessibility to one side of the cross member wall to hold the nut during assembly. In addition, the wall thickness may not provide sufficient strength for a conventional nut and bolt assembly.

Figure 2:
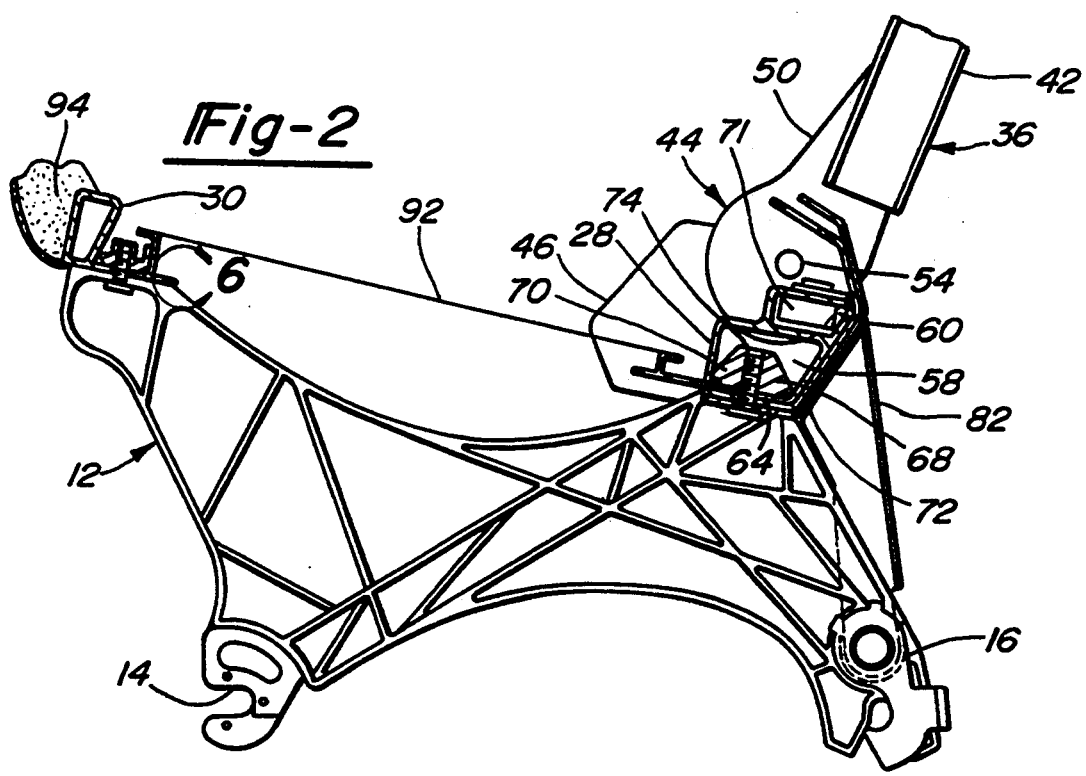
FIG. 2 is an end view of the frame of the seat assembly of the present invention.
Figure 3:
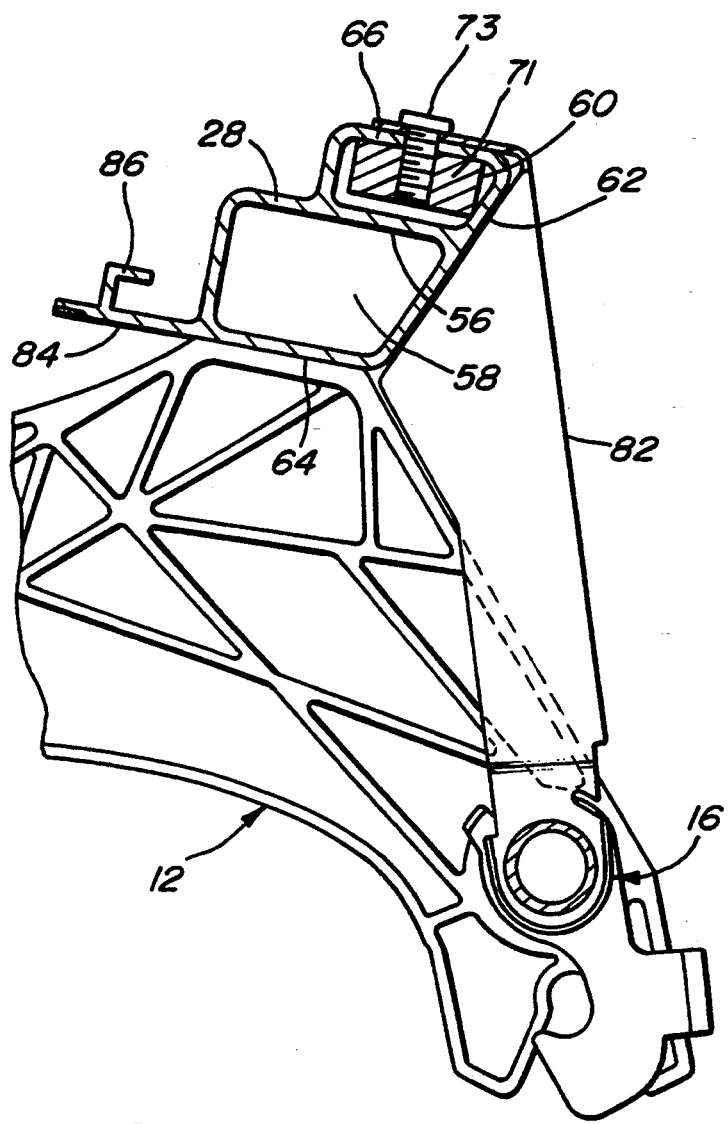
FIG. 3 is a sectional view of a seat cushion frame rear cross member including a rear portion of a seat riser.
Figure 4:
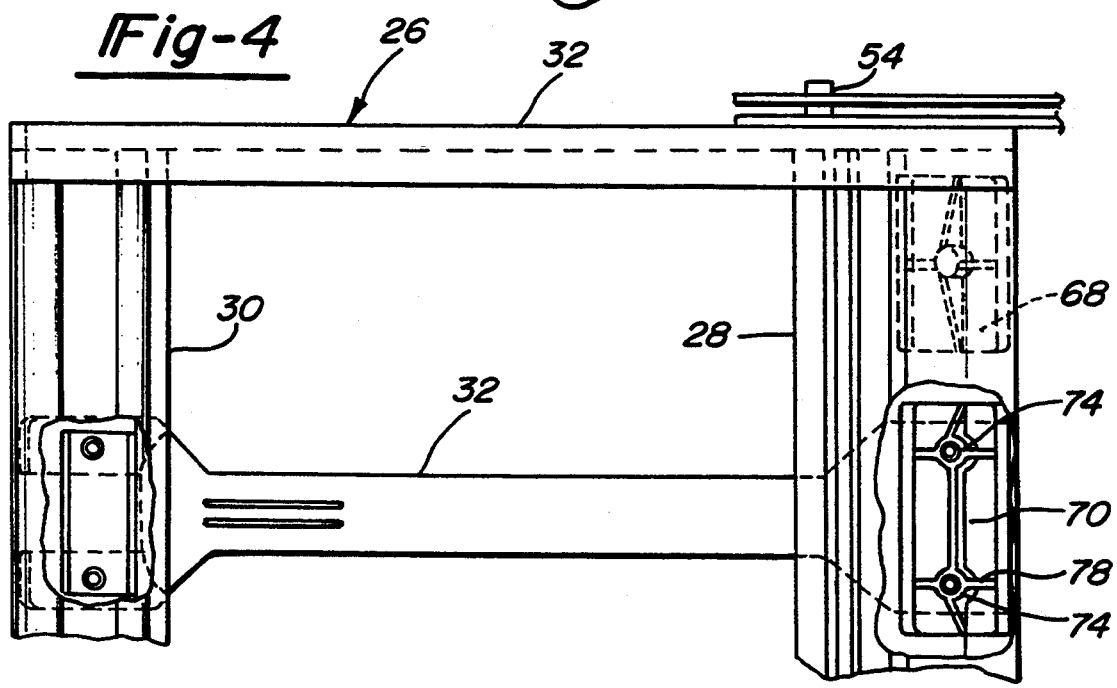
FIG. 4 is a top view of an end portion of the seat cushion frame.
Figure 5:
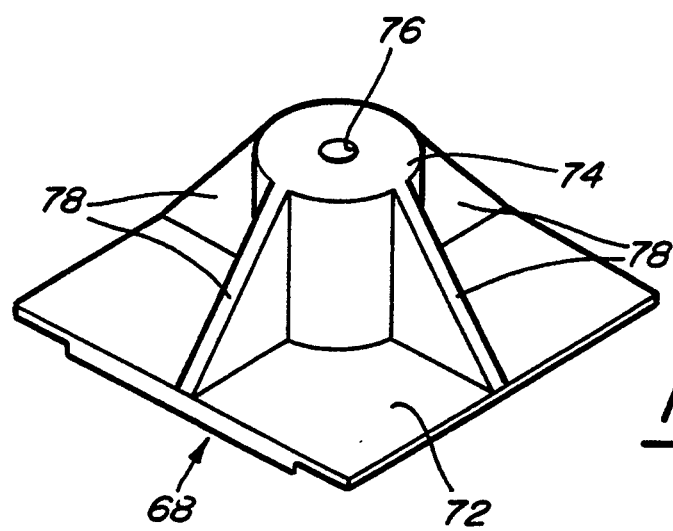
FIG. 5 is a perspective view of a tapping block used to attach components to the seat cushion frame cross member.

Attachments to the rear cross member are accomplished by the use of tapping blocks 68 or 70 inserted into one of the cavities of the cross member. The tapping blocks include an enlarged base portion 72 which engage an interior surface of an exterior wall of the cross member, the lower wall 64 as shown in FIG. 2. Each tapping block also includes a cylindrical boss 74 extending generally normal to the base portion 72. The cylindrical boss 74 has a threaded central aperture 76 for reception of a threaded fastener. Each tapping block also includes upright support flanges 78 extending radially from the cylindrical boss 74 to provide additional strength to the tapping block. Tapping blocks 68 and 70 differ from one another in that the tapping block 70 includes two cylindrical bosses 74 rather than one. The base portion 72 of the tapping blocks are preferably planar and rest against a planar exterior wall of the hollow body cross member. The enlarged base portion 72 enables the clamping load to be spread over a relatively large area of the exterior wall of the cross member.

The larger tapping block 70 is used to attach a riser 12 to the seat cushion frame using two bolts. The tapping block 68 at the end of the rear cross member is used to attach a seat belt retractor bracket and seat belt retractor to the seat assembly. Other tapping blocks 68 are used to attach seat belt bracket assemblies to which additional seat belt components are mounted. In FIG. 2 the tapping block 70 is use to attach seat belt mounting bracket 75. Seat belts, not shown, are mounted to the bracket 75.

The dual cavity construction of the rear cross member serves two functions. One function is to increase the strength of the cross member compared to a single cavity cross member. The other function of the dual cavity construction is to allow more components to be attached to the rear cross member at the same longitudinal location. This is accomplished by using a tapping block in both the lower cavity and the upper cavity. The two cavities are made of different sizes such that the attachment of higher load transmitting components can utilize the larger cavity and larger fasteners. Smaller load transmitting components can be attached using the smaller cavity. For example, a center console or armrest will not experience high loading, thus allowing the smaller cavity and tapping blocks to be used. In contrast, seat belts are attached through the larger cavity due to the high seat belt loads transferred to the seat cushion frame.

The seat assembly includes a riser stabilizer 82 that is connected to the rear cross member through a tapping block 71 and bolt 73. The riser stabilizer 82 extends downward from the rear cross member to the latch 16 used to attach the seat assembly to the vehicle floor. The riser stabilizer is made of steel and provides a load path for transmitting the seat belt loading from the rear cross member directly to the latch 16, reducing or eliminating the seat belt load carried by the risers.

The lower wall 64 of the rear cross member extends forwardly beyond the elongated hollow body to form a forwardly extending flange 84 and a raised return bent flange 86. The front cross member 30 has a similar rear extending flange 88 and a raised return bent flange 90. The raised return bent flanges 86 and 90 are used to support a suspension mat 92 between the front and rear cross members. The suspension mat in turn supports the seat cushion padding and upholstery.

Figure 6:
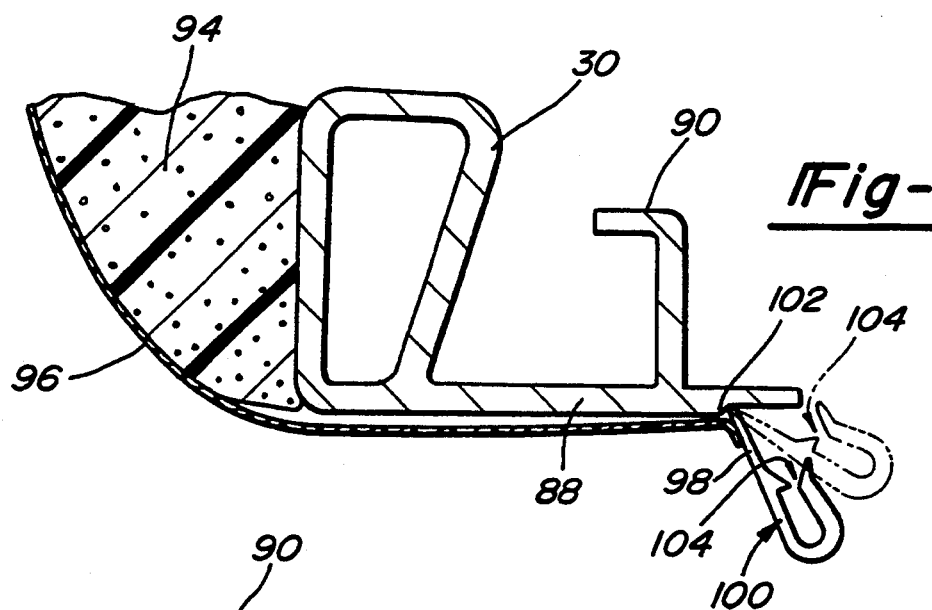
FIGS. 6–8 are sectional views of the front cross member showing the attachment of the seat trim to the cross member.
Figure 7:
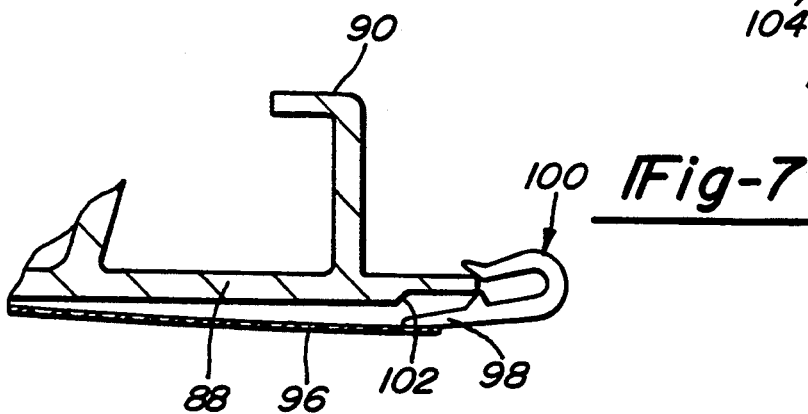
Figure 8:
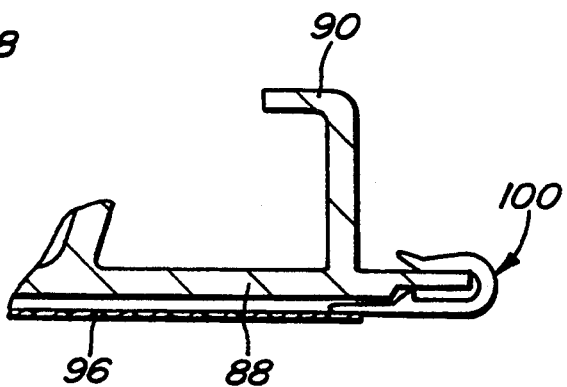

The forward extending flange 84 of the rear cross member and the rearward extending flange 88 of the front cross member are used to attach the seat trim as shown in FIGS. 6–8. The seat is upholstered with foam padding 94 and covered with trim 96. A tail portion 98 of an elongated, resilient J-clip 100 is sown to the edge of the trim.

The extending flanges are notched to form ledges 102. The ledges facilitate attachment of the trim 96 by providing a seat for the tail end of the J-clip 98. Once seated against the ledge 102, the J-clip 100 is rotated about its tail end, from a starting position indicated in solid lines, until the opening 104 of the J-clip is aligned with the flange 84 as shown in FIG. 7. The tension in the trim 96 then pulls the J-clip onto the flange 84, completing the trim installation as shown in FIG. 8.

While the present invention has been disclosed as a bench type vehicle seat assembly, it is to be understood that the present invention can be incorporated into smaller seat assemblies.

The present invention provides a seat assembly for motor vehicle having a light weight frame made of magnesium for easy removal from and reinstallation of the seat assembly into the motor vehicle. The rear cross member of the seat cushion frame is uniquely configured for high strength while at the same time providing means for attaching structural components to the seat cushion frame. The seat cushion frame components are formed with mounting flanges that extend inwardly of the seat cushion for mounting the seat trim thereto. The mounting flanges include a notched portion forming a ledge against which a tail portion of the seat trim J-clip is seated to facilitate installation of the trim on the seat assembly.

It is to be understood that the invention is not limited to the exact construction illustrated and described above, but that various changes and modifications may be made without departing from the spirit and scope of the invention as defined in the following claims.

We claim:

1. A seat assembly for a motor vehicle comprising:
a pair of laterally spaced risers adapted to be attached to a vehicle floor to install said seat assembly in the vehicle;
a seat cushion including a seat cushion frame attached to said risers, said seat cushion frame having spaced front and rear cross members extending laterally across said seat assembly and at least one fore and aft extending support member joined to and extending between said front and rear cross members, said rear cross member comprising an elongated hollow body having two cavities extending the length thereof, said two cavities sharing a common wall and having exterior walls defining said hollow body;
seat belts attached to said rear cross member;
a plurality of tapping blocks disposed within said cavities, said tapping blocks each having a base portion engaging an interior surface of an exterior wall of one of said cavities and said tapping blocks each including an aperture therein for receiving a threaded fastener means extending through said exterior wall and into said tapping block for attaching said risers to said rear cross member and for attaching said seat belts to said rear cross member; and
a seat back mounted to said seat cushion frame at the rear thereof and extending upwardly therefrom.

2. The seat assembly of claim 1 wherein said rear cross member is a magnesium extrusion.

3. The seat assembly of claim 1 wherein one of said cavities is generally positioned above the other.

4. The seat assembly of claim 3 wherein the lower cavity of the two cavities is larger in cross sectional size than the upper cavity.

5. The seat assembly of claim 1 wherein said tapping blocks each have a raised boss extending from said base portion of each tapping block into said cavities, the apertures in said tapping blocks each passing through said bosses and the cross sectional area of said bosses normal to said apertures being smaller than said base portions of said tapping blocks whereby said base portions spread the clamping loads of said fastener over an area of said exterior wall of said cavity larger than the area of said bosses.

6. The seat assembly of claim 5 wherein a portion of said tapping blocks include more than one boss extending from said base portion, each boss having an aperture for reception of a threaded fastener therein.

7. The seat assembly of claim 1 wherein:
said risers include front and rear legs and said rear legs include latch means for removably attaching said seat assembly to the vehicle; and wherein
said seat assembly further comprises stabilizer means attached to said rear cross member and to said latch means for transferring a portion of the loads applied to said rear cross member directly from said rear cross member to said latch means without passing said portion of the loads through said risers.

8. The seat assembly of claim 7 wherein said stabilizer means includes a bracket attached to said rear cross member and to said latch means.

9. The seat assembly of claim 1 wherein:
said rear cross member has a lower exterior wall that forms a portion of one of said pair of cavities and which extends forward of said one cavity forming an forwardly extending flange and wherein said seat cushion further comprises foam upholstery padding, a seat trim covering said foam padding and an elongated J-clip attached to an edge of said trim for attaching said seat trim to said forwardly extending flange of said rear cross member.

10. The seat assembly of claim 7 wherein a lower surface of said forwardly extending flange includes a notched portion extending to the distal end of said forwardly extending flange forming a front facing ledge providing a bearing surface for engagement by said J-clip during assembly of said seat assembly.

11. A seat assembly frame comprising:
an elongated magnesium extrusion forming a hollow body having two cavities extending the length thereof, said two cavities sharing a common wall and having exterior walls, including a lower exterior wall, defining said hollow body, said lower exterior wall extending from said hollow body forming an extending flange along the length of said extrusion whereby a seat trim cover can be attached to said extrusion with elongated J-shaped clips mounted on said extending flange; and
at least one tapping block within one of said two cavities, said tapping block having a base portion engaging an interior surface of one of said exterior walls of said one cavity and a boss extending from said base portion having an aperture for receiving a threaded fastener for attaching a component to said extrusion.

12. The frame of claim 11 wherein a lower surface of said extending flange includes a notched portion extending to the distal end of said extending flange forming a ledge facing away from said cavities providing a bearing surface for engagement by the J-clip during attachment of the seat trim cover to said extrusion.

13. A vehicle seat assembly comprising:

a seat cushion frame having at least one frame member generally at the periphery of said seat cushion frame, said frame member having a flange extending toward the interior of said seat cushion and said flange having a notched lower surface forming a ledge facing toward the interior of said cushion;

a foam padding supported by said frame; and a trim covering said foam padding, said trim including a J-shaped resilient clip attached to the periphery of said trim, said J-shaped clip having a hook at one end for engagement with said flange for attaching said trim to said foam pad and tail means at the opposite end for bearing engagement against said ledge to position said J-shaped clip during assembly of said seat assembly prior to placing the hook of said J-shaped clip on said flange.

14. The seat assembly of claim 13 wherein said J-shaped clip is an elongated member having a length substantially the same as said flange.

15. A seat assembly for a motor vehicle comprising:

a pair of laterally spaced risers adapted to be attached to a vehicle floor to install said seat assembly in the vehicle, said risers including front and rear legs coupled to one another;

latch means disposed on said rear legs for removably attaching said seat assembly to the vehicle;

a seat frame mounted to said risers; and elongated bracket means having two ends, one end of which is coupled to said seat frame and the other end coupled to said latch means for transferring a portion of the load applied to said seat frame directly from said seat frame to said latch means without passing said portion of the load through said front and rear legs of said risers.

* * * * *